United States Patent [19]

Fetzer

[11] Patent Number: 5,190,663

[45] Date of Patent: Mar. 2, 1993

[54] PROCESS FOR PURIFYING WASTE WATER STREAMS BY INCLUSION COMPLEXATION OF POLYNUCLEAR AROMATIC HYDROCARBONS

[75] Inventor: John C. Fetzer, Hercules, Calif.

[73] Assignee: Chevron Research and Technology Company, San Francisco, Calif.

[21] Appl. No.: 869,669

[22] Filed: Apr. 16, 1992

[51] Int. Cl.$^5$ .............................................. C02F 1/28
[52] U.S. Cl. .................................. 210/674; 210/679; 210/691; 210/909
[58] Field of Search ................ 210/674, 679, 691, 909

[56] References Cited

U.S. PATENT DOCUMENTS 4,447,315  5/1984  Lamb et al. ............................. 208/99
4,726,905  2/1988  Friedman et al. .................. 210/692

Primary Examiner—Ivars Cintins
Attorney, Agent, or Firm—W. K. Turner; R. D. Touslee

[57] ABSTRACT

A process to reduce the concentration of dissolved polynuclear aromatic hydrocarbons in an aqueous composition, particularly a refinery waste water stream, by contacting the aqueous composition with a water insoluble inclusion agent comprising an anchored cyclodextrin, said cyclodextrin having an inclusion cavity diameter of at least about 10 angstroms, under conditions which facilitate the selective formation of an inclusion complex between a cyclodextrin and a polynuclear aromatic hydrocarbon.

16 Claims, No Drawings

PROCESS FOR PURIFYING WASTE WATER STREAMS BY INCLUSION COMPLEXATION OF POLYNUCLEAR AROMATIC HYDROCARBONS

BACKGROUND OF THE INVENTION

1. Field of the Invention

The present invention relates to a process for removing dissolved polynuclear aromatic hydrocarbons from an aqueous composition by inclusion complexation using a select group of water insoluble inclusion agents comprising an anchored cyclodextrin. More particularly, the present invention provides a process for reducing the concentration of polynuclear aromatic hydrocarbons in an aqueous refinery waste stream by contacting the stream with a bed comprising a water insoluble inclusion agent comprising an anchored cyclodextrin having an inclusion cavity diameter of at least about 10 angstroms under conditions which facilitate the selective formation of an inclusion complex between the polynuclear aromatic hydrocarbon and the cyclodextrin.

2. Objects of the Invention

Waste water produced by certain industrial processes often contains contaminants that are unique to the particular industry involved. In fact, The Clean Water Act of 1972 (CWA) mandates a two part approach to establish effluent limitations for industrial waste water. First, the Act mandates nationwide base-level treatment requirements based on an assessment of what is technologically and economically achievable for a particular industry. Second, the Act mandates more stringent requirements for specific plants where necessary to achieve water quality objectives for the particular body of water into which that plant discharges its waste streams. According to some commentators, Congress intended that the Environmental Protection Agency (EPA) implement this combination of standards in a way that would force control technology innovation.

Although the Act broadly defines pollutants subject to regulation and permitting, it furnished only limited guidance with regard to toxic pollutants. Accordingly, the EPA developed a policy which focused all of the regulatory mechanisms provided by the Act upon the effective regulation of toxic or priority pollutant discharges. In developing this policy the EPA identified the pollutants which would be the primary subject of regulation and the industries which would be the primary concern in applying the regulations. This policy was adopted by Congress as a blueprint for a toxics control strategy in 1977 and 1987 amendments to the Act.

Thus, Congress has established that certain pollutants are to be identified as "priority pollutants". These pollutants are subject to effluent limitations based on the best available technology. Polynuclear aromatic hydrocarbons are priority pollutants.

Since petroleum refinery processing operations result in the formation of polynuclear aromatic hydrocarbons, the petroleum refining industry is particularly affected by the designation of polynuclear aromatic hydrocarbons as priority pollutants. For example, hydrocracking which is a high severity hydroprocessing operation to decrease the molecular weight of hydrocarbonaceous materials is known to give rise to the formation of polynuclear aromatic hydrocarbons. U.S. Pat. No. 3,619,407 issued on Nov. 9, 1971 to Hendricks et al. describes a hydrocracking process which is hindered by the formation of a broad class of organic compounds known as polynuclear aromatic hydrocarbons and identified as "benzocorenenes". The reference describes the problems caused by the tendency of such compounds to plate out onto cooler surfaces. Accordingly, researchers in the field have focused their attention on means to remove polynuclear aromatic hydrocarbons from refinery product streams. For example, co-pending U.S. patent application Ser. No. 567,427, assigned to the assignee of the present invention discloses a process for the selective precipitation of stable polynuclear aromatic hydrocarbons from the heavy hydrocarbonaceous effluent stream derived from a hydrocracking operation. As a consequence of such separation methods some fraction of these pollutant materials ultimately finds a way into refinery waste water. Such waste water will likely contain a variety of undesirable materials, some of which will be priority pollutants. The priority pollutants, as discussed above, are generally subject to more stringent regulation and handling limitations. Thus, it would be highly desirable to selectively remove the priority pollutants for special treatment.

Accordingly, it is the principal object of the present invention to provide a process for selectively removing polynuclear aromatic hydrocarbons from an aqueous composition. This and other objectives are accomplished by the process summarized below.

SUMMARY OF THE INVENTION

In accordance with the present invention, a process for removing polynuclear aromatic hydrocarbons from aqueous compositions is provided. The process takes advantage of the discovery that by selecting for use certain narrowly defined water insoluble inclusion agents comprising an anchored cyclodextrin it is possible to selectively remove dissolved polynuclear aromatic hydrocarbons from aqueous compositions. Selectivity is achieved by utilizing the select inclusion agents to process aqueous compositions characterized by a relatively low concentration of dissolved organics. This discovery has led to a process for selectively removing dissolved polynuclear aromatic hydrocarbons from an aqueous composition comprising no more than about fifteen percent (15%) by weight of dissolved organics which process comprises the step of:

contacting said aqueous composition with a water insoluble inclusion agent comprising an anchored cyclodextrin wherein said anchored cyclodextrin has an inclusion cavity diameter of at least about 10 angstroms.

In a preferred embodiment a waste water stream comprising a polynuclear aromatic hydrocarbon fraction is passed through a fixed bed comprising one or more of the select water insoluble inclusion agents of the present invention, and the effluent water is monitored for polynuclear aromatic hydrocarbon content. Once the aromatic content of the effluent water reaches a preselected maximum level, the waste water stream is diverted and the cyclodextrin component of the inclusion agent is regenerated by solvent extraction.

DETAILED DESCRIPTION OF THE INVENTION

Principal Features

Those familiar with the art related to the present invention will appreciate the full scope of the process summarized above and be able to practice the process over its full scope from a detailed description of the principal features of the process and the example which follows.

The process of the present invention is characterized by two principal features: (1) suitable inclusion agents are selected from a narrowly defined class and (2) the concentration of dissolved organics in the aqueous composition is relatively low.

In order to fully appreciate the basis for limiting the present invention to embodiments depending from these two features, it is useful to describe in some detail the theoretical chemistry involved in the formation of an inclusion complex between a polynuclear aromatic hydrocarbon and a cyclodextrin. Although the chemistry is helpful to explain the mechanism which is believed to be involved in the present invention, it is theoretical and is offered only to assist in understanding the scope of the present invention and the advantageous results which can be achieved by the present invention. Therefore it is not intended that the present invention should be limited by the theory of its operation, but rather by the resulting features.

Cyclodextrins are chiral, toroidal-shaped molecules formed by the action of the enzyme cyclodextrin transglycosylase on starch. They contain from 6 to 12 glucose units bonded together through alpha-(1,4)-linkages. The three smallest homologs, alpha-cyclodextrin, beta-cyclodextrin, and gamma-cyclodextrin are available commercially, while larger homologs must be produced and isolated individually. The secondary 2- and 3-hydroxyl groups form the mouth of the cyclodextrin cavity and have a staggered orientation. The primary 6-hydroxyls are at the opposite end of the molecule. The molecule is polar and thus water soluble. However, the inside of the cyclodextrin cavity is relatively hydrophobic since all hydroxyls are directed toward the outside of the molecule. Thus, the cyclodextrin cavity will attract and hold hydrocarbonaceous molecules. And, in fact, the cyclodextrins form inclusion complexes with a variety of organic guest molecules, i.e. molecules which are taken up by the host molecule, cyclodextrin. In other words, certain hydrocarbonaceous materials are attracted into and bind within the cyclodextrin cavity to form a complex characterized by an organic molecule included in the cyclodextrin molecule. Due to the polar nature of the molecule the resultant complex will be water soluble. In view of the ability of cyclodextrin to form inclusion complexes it is not surprising that they have been suggested as inclusion agents, and have been used in processes to separate organics from aqueous systems.

For example, U.S. Pat. No. 5,078,886, issued on Jan. 7, 1992 to Hsu describes the broad use of chiral compounds in separation processes using various adjunct phase forming materials to achieve separation.

Recalling the first principal feature of the present invention, only select inclusion agents are useful in the present invention. The useful inclusion agents are water insoluble and comprise an anchored cyclodextrin molecule specifically selected to have an inclusion cavity diameter, measured at the mouth of the inclusion cavity, of at least about 10 angstroms, preferably from about 10 angstroms to about 12 angstroms.

Accordingly, it has been found that for the purposes of the present invention only water insoluble inclusion agents comprising beta-cyclodextrin, gamma-cyclodextrin, and their derivatives and mixtures are acceptable among the commercially available cyclodextrin inclusion agents. Beta-cyclodextrin is the more preferred cyclodextrin since it is less costly as the predominant product of the degradation of starch. Delta-cyclodextrin and those cyclodextrins having even larger inclusion cavities are extremely difficult to produce, so that, although their inclusion cavities are larger (and therefore advantageous in the present invention), they are not currently readily available materials.

As previously noted, suitable inclusion agents are water insoluble. Thus, the cyclodextrin must be anchored in some fashion to an insoluble substrate to negate its inherent water solubility to be useful in the present invention. Accordingly, in the present invention the cyclodextrin must be anchored to a water insoluble substrate or carrier particle. The term "water insoluble" is a relative term. As used herein the term "water insoluble inclusion agent" means and includes inclusion agents having a solubility in water of no greater than about 0.01 grams per gram of water. Methods for preparing water insoluble inclusion agents comprising an anchored cyclodextrin by binding a cyclodextrin to particles such as silica and alumina are known. K. Fujimura, et al., Retention Behavior of Some Aromatic Compounds on Chemically Bonded Cyclodextrin Silica Stationary Phase in Liquid Chromatography, *Anal Chem.* 1983, 55, 446–450; Y. Kawaguchi, et al., Chemically Bonded Cyclodextrin Stationary Phases for Liquid Chromatographic Separation of Aromatic Compounds, *Anal. Chem.* 1983, 55, 1852–1857; H. J. Issaq, The Multimodal Cyclodextrin Bonded Stationary Phases for High Performance Liquid Chromatography, *J. Liq. Chrom.*, 1988, 11(9&10), 2131–2146 are typical. These and other water insoluble inclusion agents comprising an anchored cyclodextrin are suitable for use in the present process.

Having described in detail the select inclusion agents which are used in the process of the present invention, it is appropriate to consider the second principal feature of the present process. Certain of the cyclodextrins, those having an inclusion cavity diameter of at least 10 angstroms, have been found to inherently select polynuclear aromatic hydrocarbons over other hydrocarbons to form inclusion complexes. Thus, although nearly any hydrocarbons small enough to enter the cyclodextrin cavity will bind within the cavity, the selected cyclodextrins have been found to preferentially complex with polynuclear aromatic hydrocarbons.

As used herein the term "polynuclear aromatic hydrocarbon" is synonymous with such terms as "polycyclic aromatic," "benzoaromatic," and the like terms. Accordingly, as used herein the term "polynuclear aromatic hydrocarbon" means and includes any polynuclear aromatic hydrocarbon having a fused ring structure of between two and about ten rings, some or all of which are benzene rings. The fused ring structure is relatively flat, and the aromatic character of the structure produces a slight polarity which enhances the selectivity of the water insoluble inclusion agent for the polynuclear aromatic hydrocarbon. Particular polynuclear aromatic hydrocarbons included within the meaning of that term are thoroughly described in U.S. Pat. No. 4,618,412, issued Oct. 21, 1986, to Hudson et al., incorporated herein by reference. Accordingly, such aromatic molecules include naphthalenes and indenes (2-rings), anthracenes, phenanthrenes, fluorenes, and acenaphthenes (3-rings), benzanthracenes, benzphenanthremees, perylenes, tetracenes, and pyrenes (4-rings), benzopyrenes, benzoperylenes, pentacenes, and coronenes (7-rings), and others of this general type. Also included in this group are partially hydrogenated derivatives of the above molecules in which one or more of the aromatic rings has been hydrogenated. In particular, the polynuclear aromatic hydrocarbons referred to herein are those which contain four or more aromatic rings, especially the coronenes and benzocoronenes, which display very limited solubility in hydrocarbon mixtures. Thus, although certain polynuclear aromatic hydrocarbons are slightly more easily removed than others, the process of the present invention is broadly suitable for removing polynuclear aromatic hydrocarbons. The process of the present invention is not meant to be limited by any single structural characteristic of the polynuclear aromatic hydrocarbon being removed.

As stated above, the selected cyclodextrins of the present invention are selective for the adsorption of polynuclear aromatic hydrocarbons. We have found this to be true even for adsorption of polynuclear aromatic hydrocarbons from nonaqueous solvents. Generally, if the concentration of dissolved organics in an aqueous composition is relatively low, the attraction of the polynuclear aromatic hydrocarbon toward the anchored cyclodextrin will be greater than its attraction toward dissolution in water. Thus, the cyclodextrins have been found to be selective for the polynuclear aromatic hydrocarbons and will effect essentially complete removal of polynuclear aromatic hydrocarbons dissolved in water if the concentration of total dissolved organics is no greater than about ten percent (10%) by weight, preferably no greater than about five percent (5%) by weight.

Further, the amount of polynuclear aromatic hydrocarbon which can be removed from the aqueous composition may be controlled by adjusting the concentration of dissolved organics in the aqueous composition. In this way the process of the present invention can be controlled from application to application depending upon the desired level of selectivity for reduction of the polynuclear aromatic hydrocarbon. Since these materials have been mandated for special treatment by the CWA, it is usually desirable to remove essentially all of these pollutants. Accordingly, the process of the present invention is particularly suited for treating waste water comprising relatively low levels of dissolved organics which comprise polynuclear aromatic hydrocarbons. Typical concentrations of dissolved organics in aqueous compositions which are suitable for treatment by the process of the present invention vary within the range of from no greater than about fifteen percent (15%) by weight to as low as about 100 ppm. Preferably the concentration of dissolved organics will be no greater than about ten percent (10%) by weight with at least 100 ppm of polynuclear aromatic hydrocarbons dissolved in the aqueous composition.

Process Conditions

In order to carry out the process of the present invention an aqueous composition comprising a relatively low concentration of dissolved organics which in turn comprise polynuclear aromatic hydrocarbons is contacted with a water insoluble anchored cyclodextrin inclusion agent under conditions which favor the formation of a complex between the cyclodextrin and the polynuclear aromatic hydrocarbon.

Typically the process is carried out at conditions and for a time sufficient to reduce the amount of the polynuclear aromatic hydrocarbon to a preselected level. Suitable process conditions cover the range of conditions normally encountered in processing waste water streams. The entire operation can be carried out at ambient conditions in which case the complexation is fairly rapid, and contact times between the anchored cyclodextrin and the aqueous composition can be as short as about five (5) seconds or less. Increasing the contact time will have no detrimental effects on the process, and may, in fact, increase polynuclear aromatic hydrocarbon removal efficiency. There is a tradeoff between process conditions and the amount of cyclodextrins used. There is a stoichiometric relationship between cyclodextrins and polynuclear aromatic hydrocarbon molecules. Thus, if the complexation is inhibited, for example by rapid feed rates, high temperatures, or when purifying a waste water stream containing high hydrocarbon levels, increasing the amount of cyclodextrin increases removal efficiency.

The process may be carried out in batch, semicontinuous, or continuous operation. In batch operation, for example, loose inclusion agent is mixed with the aqueous composition in a vessel of appropriate size and, after a sufficient contact time, the treated aqueous composition is separated from the inclusion agent by filtration, centrifugation, decantation and the like. Two or more batch vessels may be used in series for increased efficiency.

Preferably the process is carried out in continuous or semicontinuous operation. In semicontinuous operation two or more fixed beds are used in swing configuration. The bed is typically supported in a packed column or tower through which the aqueous composition is passed as a stream at a suitable rate to achieve removal. Flow through the vessel can be top to bottom or vice versa. Alternatively, in continuous operation the inclusion agent may pass the aqueous composition in countercurrent flow. For example, the inclusion agent may be continuously fed to the top of a column or tower into the bottom of which the aqueous composition is fed. In general, to achieve removal it is desirable to maintain a contact time, expressed as a liquid hourly space velocity (LHSV), of at least about 40. Preferred LHSVs range from about 60 to about 720.

As the aqueous composition is contacted with the anchored cyclodextrin the hydrocarbon content of the treated aqueous composition can be monitored by known methods. For example, Federal Register Vol. 49 No. 209, dated Oct. 26, 1984, describes a chromatographic method applicable to the determination of certain polynuclear aromatic hydrocarbons. The concentration of the polynuclear aromatic hydrocarbons will normally be reduced to a level which is prescribed for the pollutants or until the polynuclear aromatic hydrocarbons can no longer be detected. The polynuclear aromatic hydrocarbons are generally limited to about 1 ppm. Once the level of hydrocarbon exceeds the maximum desirable limit, the water insoluble anchored cyclodextrin inclusion agent can be separated from the aqueous composition and extracted with an extraction solvent to remove the included organic thus regenerating the inclusion agent. Suitable extraction agents include those organic solvents boiling below about 150° C. typically used to extract polynuclear aromatic hydrocarbons. For example, benzene or its alkyl substituted derivatives are suitable. Aromatic hydrocarbons are preferred. Absent unusual circumstances, extractive regeneration is carried out at ambient conditions. The extract can then be disposed of following standard industry practices for disposal of primary pollutants.

These and other specific applications of the process are illustrated by the following example.

EXAMPLE

The following Example is provided as a laboratory scale example illustrative of a procedure which can be used to confirm the efficacy of the present invention.

A liter of distilled water is vigorously stirred with sufficient amount of an alkane solution containing, in roughly equal proportions by volume, hexane, cyclohexane, and isooctane to form an aqueous solution containing no greater than about fifteen percent by weight of dissolved organics. The water containing dissolved alkanes is then separated from excess alkane solution.

One hundred (100) milliliters of the water with dissolved alkanes is then combined with a polynuclear aromatic hydrocarbon mixture of roughly equal proportions by weight of pyrene, perylene, and benzo[a]pyrene to give an aqueous sample containing approximately 100 ppm of polynuclear aromatic hydrocarbons. The aqueous sample is then analyzed using UV spectrometry. UV absorbencies at 335 nm, 385 nm, and 435 nm indicate the presence and relative concentrations of pyrene, benzo[a]pyrene, and perylene, respectively.

One (1) gram of a Water insoluble inclusion agent comprising an anchored beta-cyclodextrin is then added to the aqueous sample with vigorous mixing. After a minute of additional mixing the beta-cyclodextrin is filtered from the purified aqueous sample. The purified sample is again analyzed using UV spectrometry. The reduction in the absorbencies at 335 nm, 385 nm, and 435 nm indicates that the polynuclear aromatic hydrocarbons have been substantially completely removed from the aqueous composition.

Other cyclodextrins having an inclusion cavity diameter of at least about 10 angstroms, such as gamma-cyclodextrin and mixtures of beta-cyclodextrin with gamma-cyclodextrin, can be substituted for beta-cyclodextrin in this procedure and equivalent results will be obtained. Similarly, other dissolved organics may be substituted for hexane, cyclohexane, and/or isooctane in this procedure and equivalent results will be obtained; and other polynuclear aromatic hydrocarbons may be substituted for pyrene, benzo[a]pyrene, and/or perylene and equivalent results will be obtained.

There are numerous variations on the above example which are possible in light of the teachings supporting the present invention. It is therefore understood that within the scope of the following claims, the invention may be practiced otherwise than as specifically described or exemplified herein.

What is claimed is:

1. A process for removing dissolved polynuclear aromatic hydrocarbons from an aqueous composition which comprises the step of:
    contacting said composition with a water insoluble inclusion agent comprising an anchored cyclodextrin, said cyclodextrin having an inclusion cavity diameter of at least about 10 angstroms; and
    wherein the concentration of dissolved organics in said aqueous composition is no greater than about fifteen percent by weight.

2. A process according to claim 1 wherein said contacting is carried out under ambient conditions.

3. A process according to claim 2 wherein no more than ten percent by weight of said composition is dissolved organics and at least about 100 ppm of said composition is dissolved polynuclear aromatic hydrocarbons.

4. A process according to claim 1 wherein said polynuclear aromatic hydrocarbons comprise two to about ten ring hydrocarbons.

5. A process according to claim 1 wherein said aqueous composition is a refinery waste water stream.

6. A process according to claim 1 wherein said anchored cyclodextrin is selected from the group consisting of beta-cyclodextrin, delta-cyclodextrin, their derivatives or mixture thereof.

7. A process according to claim 6 wherein at least a portion of said anchored cyclodextrin is beta-cyclodextrin or its derivatives.

8. A process according to claim 6 wherein at least a portion of said anchored cyclodextrin is beta-cyclodextrin.

9. A process according to claim 1 wherein at least a portion of said anchored cyclodextrin has an inclusion cavity diameter of from about 10 angstroms to about 12 angstroms.

10. A process according to claim 1 wherein at least a portion of said anchored cyclodextrin is supported on silica or alumina.

11. A process according to claim 10 wherein at least a portion of said anchored cyclodextrin is selected from the group consisting of beta-cyclodextrin, delta-cyclodextrin, or their derivatives or mixtures thereof.

12. A process according to claim 11 wherein at least a portion of said anchored cyclodextrin is beta-cyclodextrin or delta-cyclodextrin.

13. A process according to claim 12 wherein at least a portion of said anchored cyclodextrin is beta-cyclodextrin.

14. A process according to claim 1 wherein said water insoluble anchored cyclodextrin inclusion agent is contacted with said composition by passing said composition through a fixed bed comprising said inclusion agent.

15. A process according to claim 14 wherein said process is carried out at a liquid hourly space velocity of about 40.

16. A process according to claim 1 wherein said process is carried out until the effluent of said process comprises a preselected maximum level of polynuclear aromatic hydrocarbon at which time the anchored cyclodextrin is regenerated by solvent extraction.

* * * * *